1001

(12) United States Patent
Hasegawa

(10) Patent No.: US 9,013,770 B2
(45) Date of Patent: Apr. 21, 2015

(54) IMAGE PROCESSING DEVICE DETERMINING WHETHER IMAGE IS CHROMATIC COLOR IMAGE OR ACHROMATIC COLOR IMAGE

(71) Applicant: Tomohiko Hasegawa, Okazaki (JP)

(72) Inventor: Tomohiko Hasegawa, Okazaki (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/225,687

(22) Filed: Mar. 26, 2014

(65) Prior Publication Data

US 2014/0293380 A1     Oct. 2, 2014

(30) Foreign Application Priority Data

Mar. 26, 2013 (JP) ................................ 2013-063817

(51) Int. Cl.
| | |
|---|---|
| H04N 1/46 | (2006.01) |
| G06K 15/00 | (2006.01) |
| G06F 3/12 | (2006.01) |
| G06K 9/34 | (2006.01) |
| H04N 1/56 | (2006.01) |

(52) U.S. Cl.
CPC ..................................... H04N 1/56 (2013.01)

(58) Field of Classification Search
USPC ........... 382/199, 164, 165, 170; 358/505, 1.9, 358/1.2, 1.13, 515
See application file for complete search history.

(56) References Cited

U.S. PATENT DOCUMENTS

| | | | | |
|---|---|---|---|---|
| 8,605,345 | B2* | 12/2013 | Ohkawa ......................... | 358/505 |
| 2007/0121136 | A1* | 5/2007 | Gotoh et al. ................... | 358/1.9 |
| 2008/0239354 | A1* | 10/2008 | Usui ............................... | 358/1.9 |
| 2009/0116738 | A1* | 5/2009 | Kubota .......................... | 382/165 |
| 2009/0190830 | A1* | 7/2009 | Hasegawa ..................... | 382/165 |
| 2009/0225339 | A1* | 9/2009 | Kakigi ........................... | 358/1.9 |
| 2009/0268964 | A1* | 10/2009 | Takahashi ..................... | 382/170 |
| 2009/0274363 | A1* | 11/2009 | Dai ................................ | 382/164 |
| 2010/0231929 | A1* | 9/2010 | Kakigi ........................... | 358/1.2 |
| 2011/0116112 | A1* | 5/2011 | Muramatsu .................... | 358/1.9 |
| 2011/0228361 | A1* | 9/2011 | Ohkawa ......................... | 358/505 |
| 2012/0162680 | A1* | 6/2012 | Mori ............................. | 358/1.13 |
| 2013/0259383 | A1* | 10/2013 | Kondo et al. ................. | 382/199 |

FOREIGN PATENT DOCUMENTS

| | | |
|---|---|---|
| JP | H03-44268 A | 2/1991 |
| JP | 2004-096625 A | 3/2004 |
| JP | 2005-286571 A | 10/2005 |
| JP | 2006-203939 A | 8/2006 |

(Continued)

*Primary Examiner* — Marivelisse Santiago Cordero
*Assistant Examiner* — Daryl Jackson
(74) *Attorney, Agent, or Firm* — Banner & Witcoff, Ltd.

(57) ABSTRACT

In an image processing device, the control device identifies a background color of the image. The control device classifies each of the pixels into either one of a background color pixel group or a non-background color pixel group. The control device determines whether a partial region of the image having the non-background pixel is a chromatic color region or an achromatic color region, without using pixel values corresponding to pixels classified into the background color pixel group. The control device determines that the image is chromatic color image when it is determined that the partial region is the chromatic color region. The control device determines that the image is achromatic color image when it is determined that the partial region is the achromatic color region.

7 Claims, 9 Drawing Sheets

(56) References Cited

FOREIGN PATENT DOCUMENTS

| JP | 3944032 B2 | 7/2007 |
| JP | 4047356 B2 | 2/2008 |
| JP | 2010-004278 A | 1/2010 |
| JP | 2010-004383 A | 1/2010 |
| JP | 2010-226315 A | 10/2010 |
| JP | 2010-288146 A | 12/2010 |
| JP | 2011-193380 A | 9/2011 |
| JP | 2012-142761 A | 7/2012 |
| JP | 2012-209908 A | 10/2012 |

* cited by examiner

IMAGE PROCESSING DEVICE DETERMINING WHETHER IMAGE IS CHROMATIC COLOR IMAGE OR ACHROMATIC COLOR IMAGE

CROSS REFERENCE TO RELATED APPLICATION

This application claims priority from Japanese Patent Application No. 2013-063817 filed Mar. 26, 2013. The entire content of the priority application is incorporated herein by reference.

TECHNICAL FIELD

The present invention relates to a technique for determining whether an image in acquired data is a color image or an achromatic color image based on the acquired data.

BACKGROUND

There is known an image processing device for determining whether an original image is a color image or an achromatic color image based on read image data. Here, the read image data represents the original image and is obtained by reading the original image by the image reading unit. The image processing device divides the read image into a plurality of blocks and executes a block determining process for determining whether each of the blocks is a chromatic color block or an achromatic color block. More specifically, the image processing device determines whether the number of chromatic color pixels among from all the pixels in the block is greater than or equal to a threshold value or not. Based on the result of this determination, the image processing device determines whether the block is a chromatic color block or an achromatic color block. This determination is made for each of the blocks. The image processing device determines that the original image is a chromatic color image when the ratio of the number of chromatic color blocks to the total number of blocks is greater than or equal to a predetermined ratio.

SUMMARY

However, as described above, the conventional image processing device constantly executes a block determining process on all the pixels in each of the blocks. As a result, there can arise a problem that, for instance, if a block includes background color pixels that are achromatic color pixels in the background part of a read image, and also includes non-background color pixels that are chromatic color pixels corresponding to letters, for example, in the non-background part of the read image, the image processing device erroneously determines that the block is an achromatic color block, although the image processing device should determine that the block is a chromatic color block. Consequently, the image processing device erroneously determines that the original image is an achromatic color image though the original image should be determined as a chromatic color image.

In view of the foregoing, it is an object of the invention to provide a technique to prevent erroneous determinations in which an image is determined as an achromatic color image though that the image should be determined as a chromatic color image.

In order to attain the above and other objects, the invention provides an image processing device. The image processing device includes an acquiring unit and a control device. The acquiring unit is configured to acquire image data that has pixel values and represents an image having pixels corresponding to the pixel values. The control device is configured to: identify a background color of the image; classify each of the pixels into either one of a background color pixel group and a non-background color pixel group, classification into the background color pixel group being made when a pixel value indicates the background color, classification into the non-background color pixel group being made when a pixel value does not indicate the background color; determine whether a partial region of the image having the non-background pixel is a chromatic color region or an achromatic color region, without using pixel values corresponding to pixels classified into the background color pixel group; determine that the image is chromatic color image when it is determined that the partial region is the chromatic color region; and determine that the image is achromatic color image when it is determined that the partial region is the achromatic color region.

According to another aspect, the present invention provides a non-transitory computer readable storage medium storing a set of program instructions installed on and executed by a computer acquiring image data that has pixel values and represents an image having pixels corresponding to the pixel values. The program instructions includes: identifying a background color of the image; classifying each of the pixels into either one of a background color pixel group and a non-background color pixel group, classification into the background color pixel group being made when a pixel value indicates the background color, classification into the non-background color pixel group being made when a pixel value does not indicate the background color; determining whether a partial region of the image having the non-background pixel is a chromatic color region or an achromatic color region, without using pixel values corresponding to pixels classified into the background color pixel group; determining that the image is chromatic color image when it is determined that the partial region is the chromatic color region; and determining that the image is achromatic color image when it is determined that the partial region is the achromatic color region.

BRIEF DESCRIPTION OF THE DRAWINGS

The particular features and advantages of the invention as well as other objects will become apparent from the following description taken in connection with the accompanying drawings, in which.

DETAILED DESCRIPTION

Figure 1:
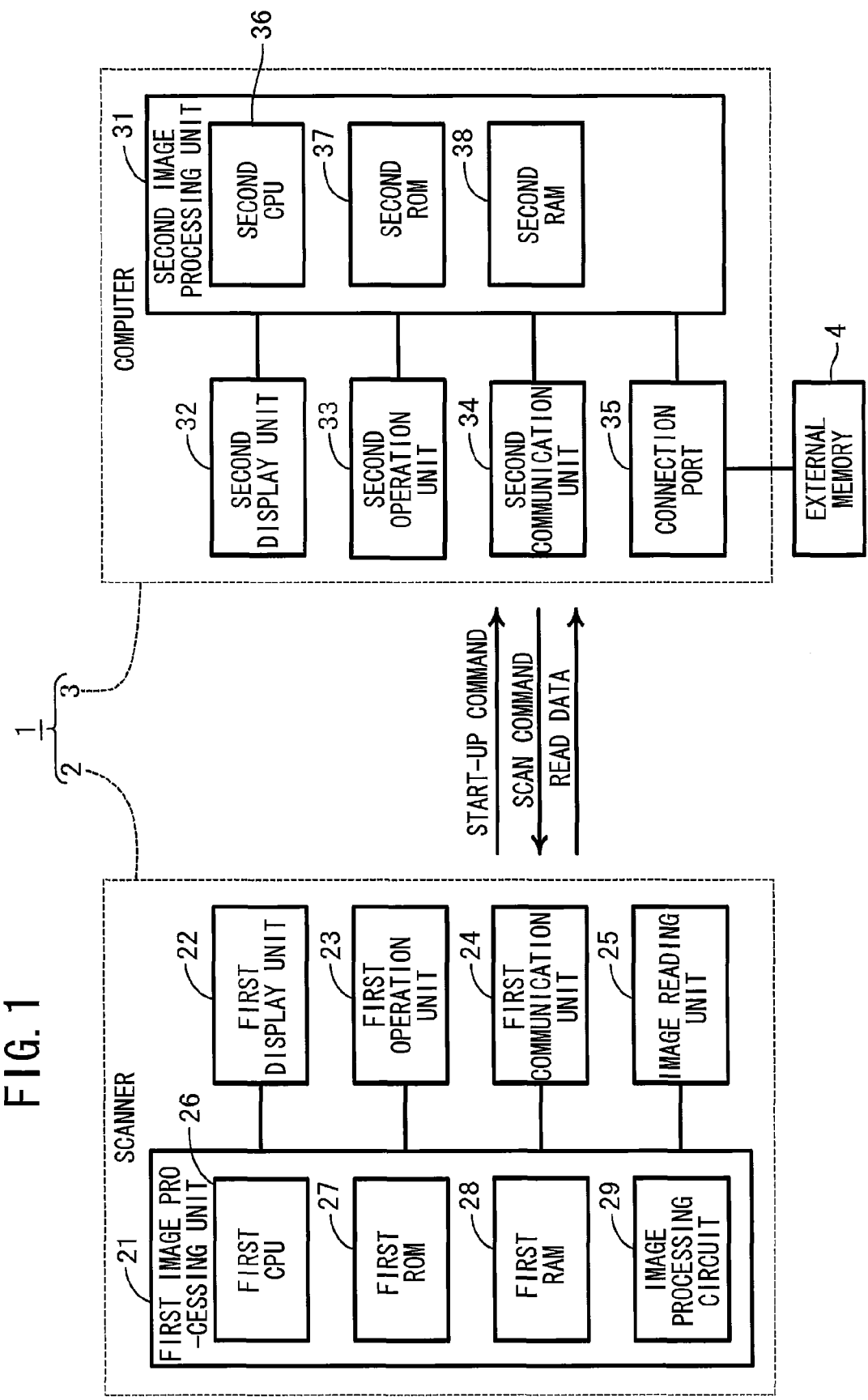
FIG. 1 is a block diagram illustrating an image processing system according to a first embodiment of the invention.

An image processing system 1 according to an embodiment of the invention will be described while referring to the accompanying drawings. The image processing system 1 includes a scanner 2, a personal computer (hereinafter referred to as "computer") 3. The scanner 2 and the computer 3 are capable of performing wired or wireless bidirectional data communication.

(Configuration of Scanner)

The scanner 2 includes a first image processing unit 21, a first display unit 22, a first operation unit 23, a first communication unit 24, and an image reading unit 25.

The first image processing unit 21 is a control section that controls the image reading unit 25 and other parts and has a central processing unit (hereinafter referred to as first CPU) 26, a first ROM 27, a first RAM 28 and an image processing circuit 29. The first ROM 27 stores programs for executing various operations of the scanner 2. The first CPU 26 controls various parts of the scanner 2 according to the program read from the first ROM 27. The recording medium for storing the various programs is not limited to the first ROM 27 and the first RAM 28. That is, the recording medium may be non-volatile recording mediums such as a CD-ROM, a hard disk device, a flash memory, a storage device.

The image processing circuit 29 is a hardware circuit dedicated to image processes and can execute image processes on read data. The first display unit 22 has a liquid crystal display and a lamp and can display various images (screens) for settings and operation states of the scanner 2 and other devices. The first operation unit 23 has a plurality of buttons so that the user can perform various input operations by using the buttons. The first communication unit 24 performs wireless or wired communications with external devices to transmit data to the external devices or receives data from the external devices.

The image reading unit 25 is a reading device having a CIS (contact image sensor). The image reading unit 25 reads an image G on an original sheet (not shown) on line basis and outputs read data corresponding to pixels in read line(s) of the image G. The read data includes image data represented in RGB (red, green, and blue) color space. The image reading unit 25 is not limited to the CIS, but may be a CCD (charge coupled device) image sensor. The analog-digital conversion process is performed on the read data outputted from the image reading unit 25 by an AD conversion part (not shown). The converted read data is stored in the first RAM 28.

(Configuration of Computer)

The computer 3 includes a second image processing unit 31, a second display unit 32, a second operation unit 33, a second communication unit 34, and a connection port 35.

The second image processing unit 31 has a central processing unit (referred to as the second CPU) 36, a second ROM 37, and a second RAM 38. The second ROM 37 stores the program of the scanner driver for executing an image process for the read image and the programs for performing various operations (or functions) of the computer 3. The second CPU 36 controls the various parts of the computer 3 according to the program read from the second ROM 37. The recording medium for storing the various programs is not limited to the second ROM 37 and the second RAM 38. That is, the recording medium may be non-volatile recording mediums such as a CD-ROM, a hard disk drive, a flash memory, and a storage device.

The second display unit 32 has a liquid crystal display and a lamp and can display various images for settings screen and operation states of the computer 3, the scanner 2, and other devices. The second operation unit 33 has a plurality of buttons so that the user can perform various input operations by using the buttons. The second communication unit 34 performs wireless or wired communications with external devices to transmit data to the external devices or receives data from the external devices.

The connection port 35 can be connected to an external memory 4 to acquire the image data stored in the external memory. The connection port 35 is a USB (universal serial bus) port and the external memory is a USB memory, for example.

(Scanning Process)

Figure 2:
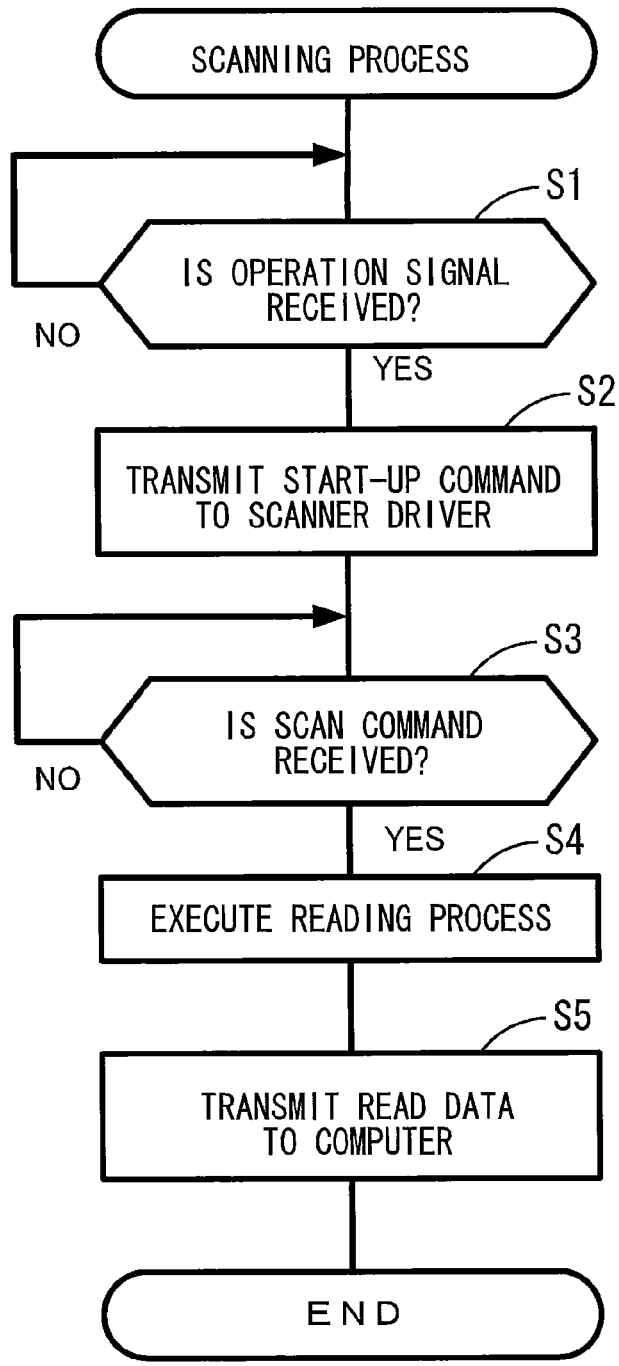
FIG. 2 is a flowchart illustrating a scanning process according to the first embodiment.

As the power supply to the scanner 2 is turned on, the first image processing unit 21 repeatedly executes scanning processes shown in FIG. 2 at predetermined intervals. In the scanning process, the image reading unit 25 reads the image of an original sheet to generate read data, and the first communication unit 24 transmits the read data to the computer 3.

More specifically, in S1, the first CPU 26 determines whether an operation signal was received or not. Here, the operation signal indicates that the user inputs instructions to execute a scanning operation or not. While the first CPU 26 determines that the operation signal is not received (S1: NO), the first CPU 26 waits for the operation signal. If the first CPU 26 determines that the operation signal is received (S1: YES), in S2 the first CPU 26 transmits a start-up command of the seamier driver to the computer 3 via the first communication unit 24 (FIG. 1). The start-up command instructs the computer 3 to start the scanner driver.

In S3, the first CPU 26 determines whether the first communication unit 24 received a scan command (FIG. 1) that was transmitted from the computer 3 in response to the start-up command (to be described later). While the first CPU 26 determines that the scan command was not received (S3: NO), the first CPU 26 waits for the scan command. If the first CPU 26 determines that the scan command was received (S3: YES), in S4 the first CPU 26 starts executing a reading process. More specifically, the first CPU 26 controls the image reading unit 25 to read the image of the original sheet and stores the read data output from the image reading unit 25 in the first RAM 28.

After starting the reading process, in S5 the first CPU 26 controls the first communication unit 24 to transmit the read data to the computer 3 (see FIG. 1). After the transmission of the read data is completed, the first CPU 26 ends the scan process. The first CPU 26 executes S1 again after a predetermined time period is elapsed.

In the scanning process, after the entire image of the original sheet is read, the first image reading unit 21 may transmit the read data corresponding to the entire image G of the original sheet. Alternatively, while reading an image of the original sheet, the first image reading unit 21 may sequentially transmit read data corresponding to a partial image of the entire image G.

(Control Process)

Figure 3:
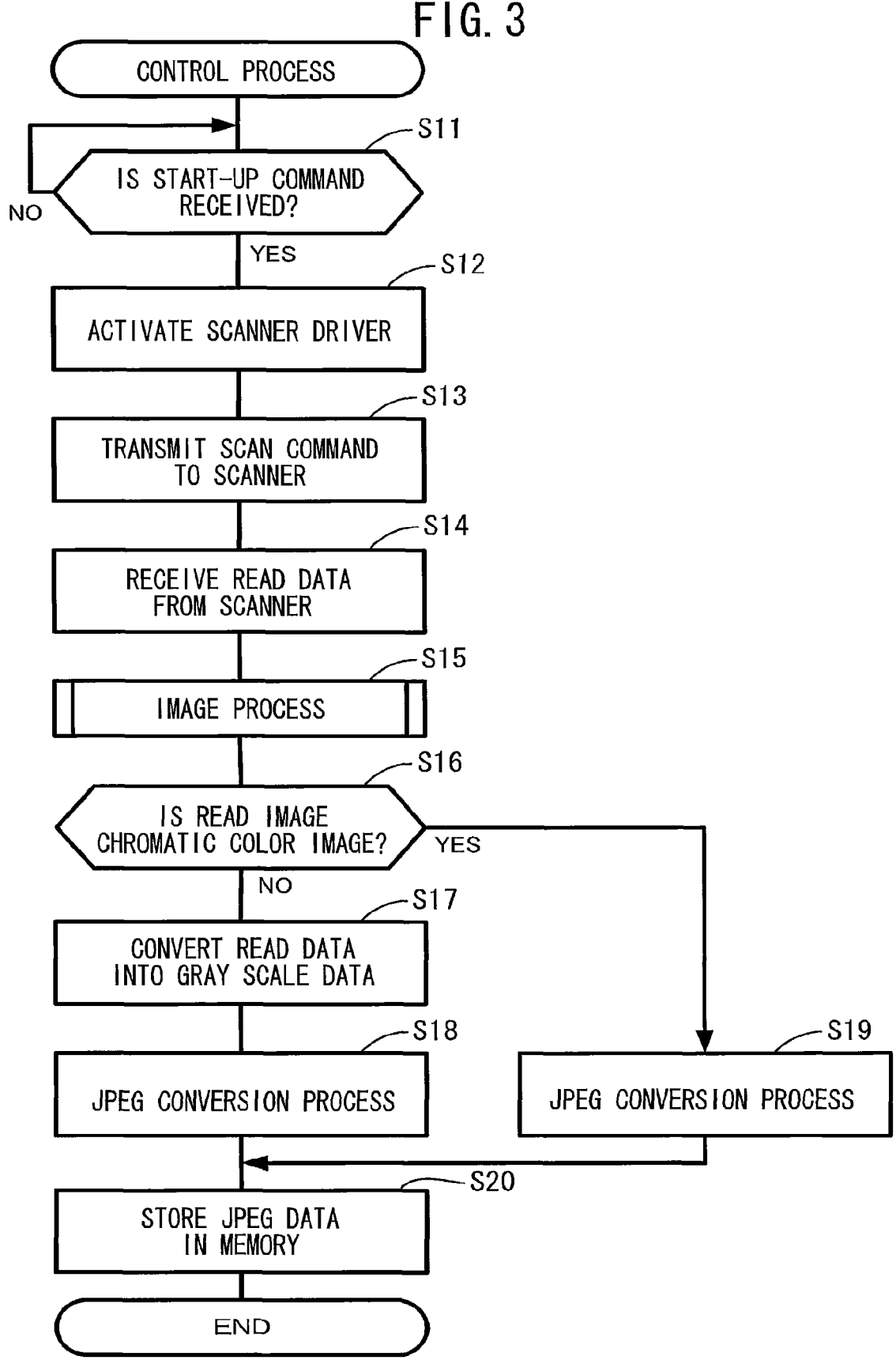
FIG. 3 is a flowchart illustrating a control process according to the first embodiment.

After the computer 3 is turned on, the second image processing unit 31 repeatedly executes control processes shown in FIG. 3 at predetermined intervals. The control process determines whether the read image G received from the scanner 2 is a chromatic color image or an achromatic color image.

(1) Reception of Read Data

More specifically, in S11 the second CPU 36 determines whether the second communication unit 34 received the start-up command from the scanner 2 or not. While the second CPU 36 determines that the start-up command was not received (S11: NO), the second CPU 36 waits for the start-up command. If the second CPU 36 determines that the start-up command was received (S11: YES), in S12 the second CPU 36 reads out the program of the scanner driver from second RAM 38 and starts to execute the scanner driver.

After starting the scanner driver, in S13 the second CPU 36 transmits the scan command to the scanner 2 via the second communication unit 34 (FIG. 1). Subsequently, in S14 the second CPU 36 receives the read data transmitted from the scanner via the second communication unit 34, and stores the read data in the second RAM 38.

(2) Image Process on Read Data

Figure 4:
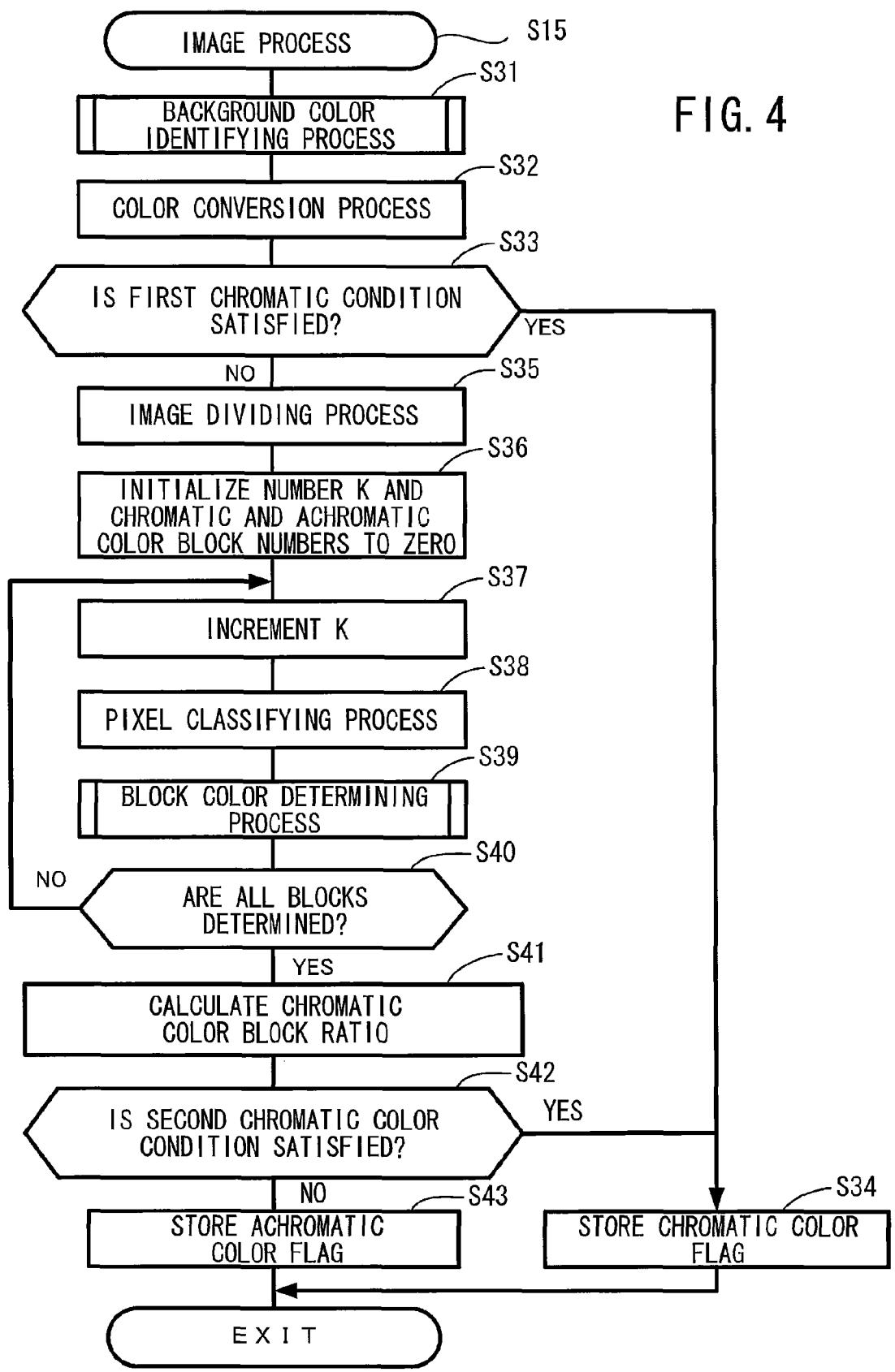
FIG. 4 is a flowchart illustrating an image process according to the first embodiment.

As the second CPU 36 receives the read data, in S15, the second CPU 36 starts executing the image process shown in FIG. 4. The second CPU 36 may start the image process after receiving the read data corresponding to the entire image G. Alternatively, the second CPU 36 may start the image process before receiving the entire image worth of read data. In this case, while receiving read data corresponding to a partial image of the original sheet, the second CPU 36 sequentially performs the image process on the read data corresponding to the partial image of the original sheet.

(2-1) Background Color Identifying Process

Figure 5:
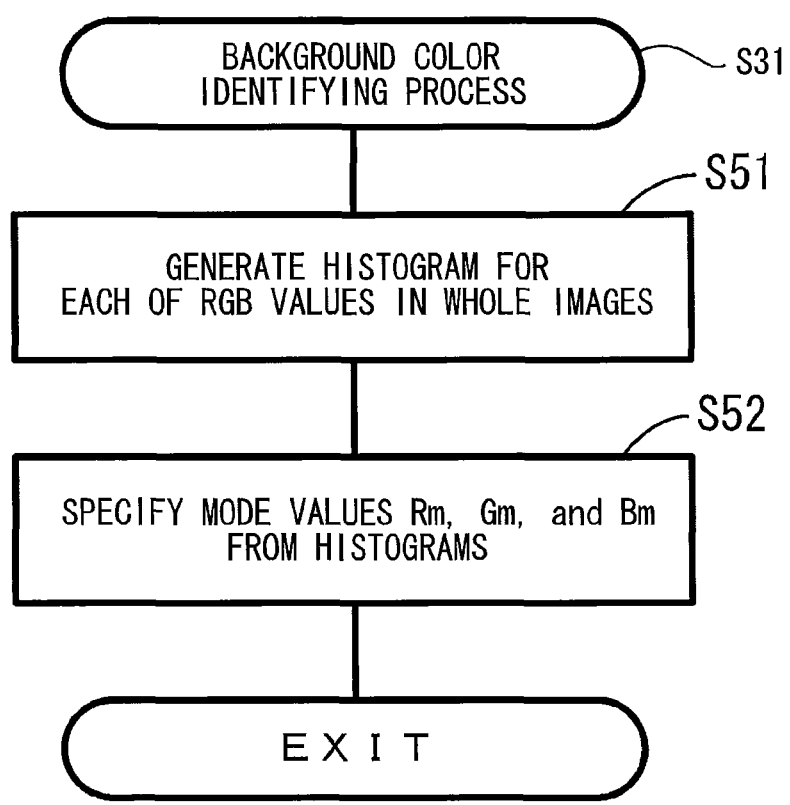
FIG. 5 is a flowchart illustrating a background color identifying process according to the first embodiment.

At the beginning of the image process, in S31 the second CPU 36 executes the background color identifying process for the read image using the read data stored in the second RAM 38. The background color identifying process identifies the background color of the read image G. More specifically, as shown in FIG. 5, in S51 the second CPU 36 generates histograms with respect to image density values for all the pixels constituting the entire image G. Here, the image density values are pixel values of one of R, G, and B primary colors. That is, the second CPU 36 generates a histogram of R values for all the pixels constituting the entire image G, a histogram of G values for all the pixels constituting the entire image G, and a histogram of B values for all the pixels constituting the entire image G.

Figure 6:
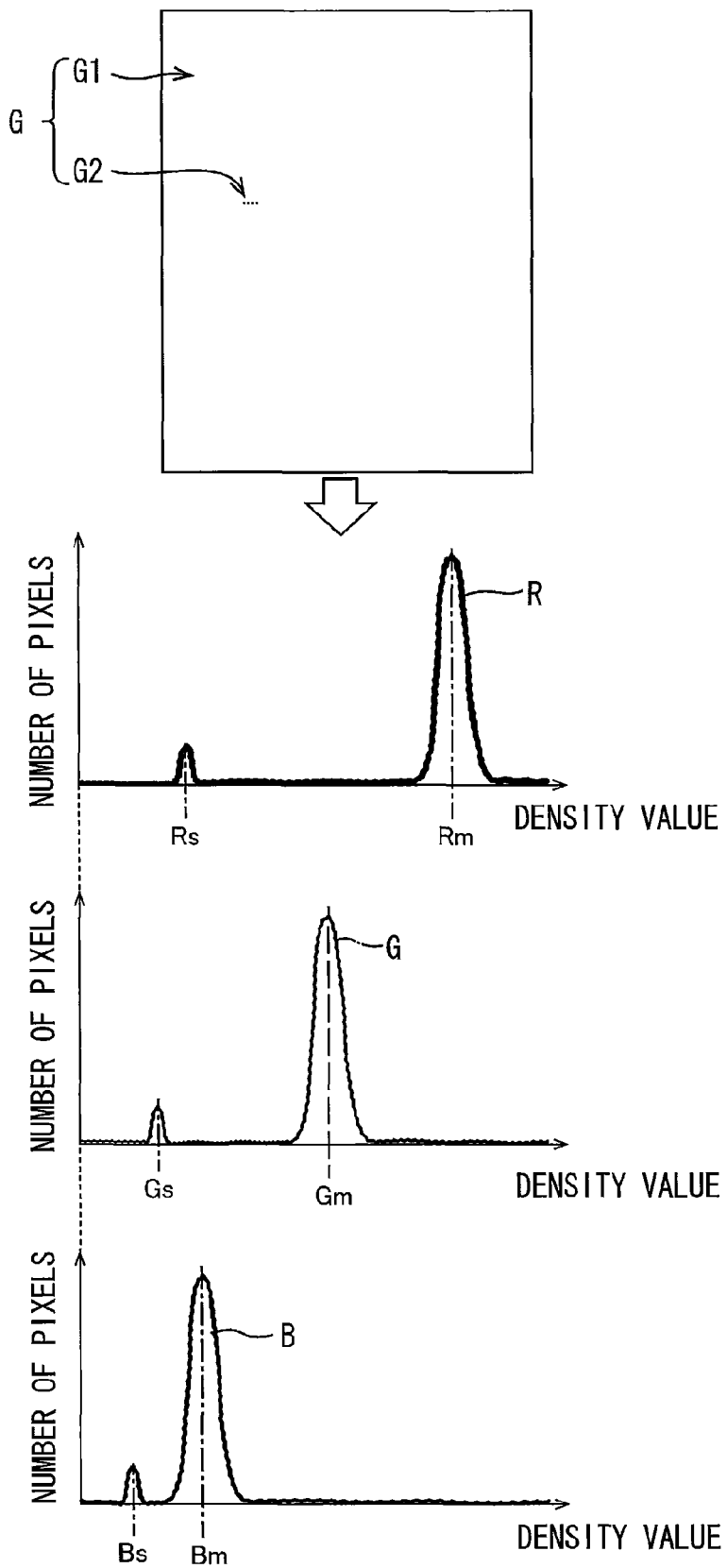
FIG. 6 is an explanation diagram including histograms of each of primary colors in read image data according to the first embodiment.

FIG. 6 shows histograms of the read image G for each of the RGB colors. In this example, the read image G includes a background region (plain region) G1 and one or more tiny non-background region(s) G2 on the background region 1. The background color region G1 includes none of letters, graphs and symbols. The non-background color region G2 includes at least one of a letter, a graph, and a symbol. The size of a non-background color region G2 is much smaller than the size of a block B (described below). In the example shown in FIG. 6, the non-background region G2 includes a string of letters A, B, C and D.

In each of the histograms of the primary colors, the vertical axis indicates the number of pixels (pixel count) and the horizontal axis indicates the density. As shown in each of the histograms of the primary colors, most of the pixels have density values Rm, Gm and Bm corresponding to the background color. Only a small number of pixels have density values Rs, Gs and Bs, corresponding to the non-background color.

In S52, the second CPU 36 determines a mode value in the histogram of each of the primary colors. The mode value is a density value that appears most often in data (the read data of the image G1 in this example). In the example shown in FIG. 6, the density values Rm, Gm and Rm are the mode values. The second CPU 36 identifies the background color of the read image G by using the density values of Rm, Gm and Bm. Because the background color of a read image G is determined by the mode values, the background color of the read image G can be identified in a more accurate manner than a comparative example (described later) where the background color is determined from the density average values of the pixels of a read image G.

When the background color identifying process ends, the second CPU 36 proceeds to S32 shown in FIG. 4. The second CPU 36 executes a background color determining process (S32, S33) that determines whether the background is a chromatic color or an achromatic color. That is, in S32, the second CPU 36 executes a color conversion process that converts the mode values Rm, Gm, and Bm of the primary colors into data represented in a color space having luminance component and color difference components. More specifically, the second CPU 36 converts the mode values Rm, Gm, and Bm into data represented in YCbCr color space. The data represented in YCbCr color space includes data of the brightness Y and data of the two color differences (chroma and hue) Cb and Cr.

Each of the color differences Cb and Cr is a normalized value obtained by adding 128 to a value within a range from −128 to +128. That is, each of the color differences Cb and Cr is within a range between 0 and 255. A range between 0 and 99 and a range between 157 and 255 of the color differences are the chromatic color range. A range between 100 and 156 of the color differences is the achromatic color range.

In S33, the second CPU 36 determines whether the background color satisfies a first chromatic color condition or not. That is, the second CPU 36 calculates the average value Cba of the color differences Cb and the average value of Cra of the color differences Cr. The first chromatic color condition is that at least one of the average value Cba and the average value Cra is within the chromatic color range described above.

Figure 7:
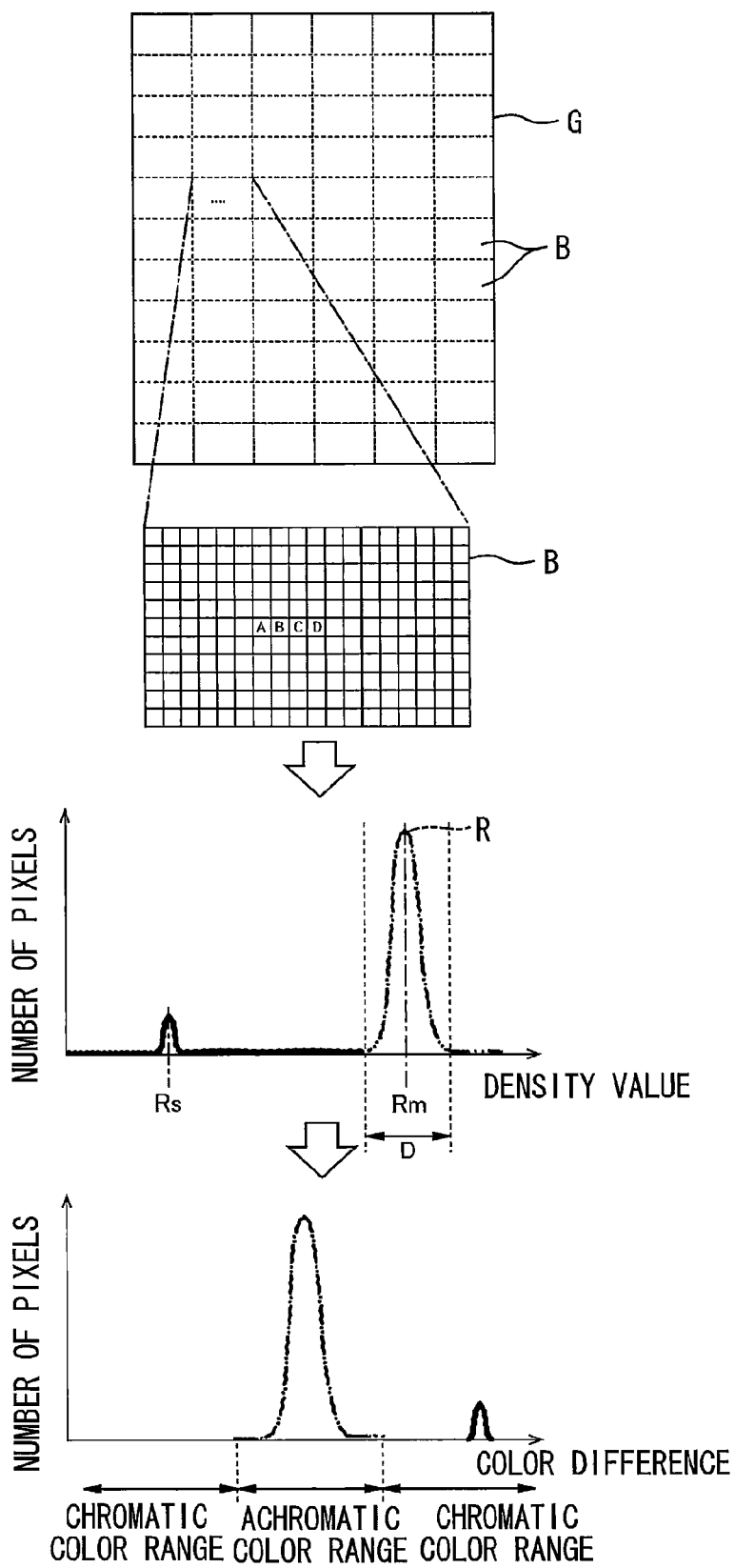
FIG. 7 is an explanation diagram including histograms of density values and color differences according to the first embodiment.

When the second CPU 36 determines that the background color satisfies the first chromatic color condition (S33: YES), the read image G is highly probably a chromatic color image. Thus, in S34 the second CPU 36 determines that the read image G is a chromatic color image and stores a chromatic color flag in the second RAM 38. Subsequently, the second CPU 36 ends the image process and proceeds to S16 shown in FIG. 3. For example, if the background color region G1 of the read image G shown in FIG. 7 is a chromatic color, the second CPU 36 determines that the background color satisfies the first chromatic color condition (S33: YES) and also determines that the read image G1 is a chromatic color image without determining whether the non-background regions G2 are chromatic color or achromatic color.

Even when the second CPU 36 determines that the background color does not satisfy the first chromatic color condition (S33: NO), the second CPU 36 does not determine that the read image G is an achromatic color image based only on the result of the background color determining process (S32, and S33). Instead, the second CPU 36 executes the following steps from S33 to S42 to determine a color (chromatic color or achromatic color) of the non-background color region G2, thereafter, ultimately determines whether the read image G is a chromatic color image or an achromatic color image. This determination is made by executing the following processes: an image dividing process dividing the read image G (or, entire region of the image G) into blocks (S35); a pixel classifying process determining the pixel type (S38); a block color determining process determining (S39); a non-background color determining process (S41, S42); and an image color determining process (S34, S43).

(2-2) Image Dividing Process

Firstly, in S35 the second CPU 36 executes the image dividing process. More specifically, as shown in an upper part of FIG. 7, the second CPU 36 divides the read image G (or entire region of the image G) into a plurality of rectangular blocks B having the same size. In the embodiment, each block B has a side (vertical side) along which 11 pixels are arranged in each column, and a side (horizontal side) along which 18 pixels are arranged in each row. That is, the total number of pixels in the block B is equal to 198. The second CPU 36 may receive a part of the read data of the read image G that corresponds to a predetermined number of lines. In this case, each time the second CPU 36 receives predetermined number of lines worth of data, the second CPU 36 sequentially executes the image dividing process on the received data. Here, the predetermined number of lines is equal to or greater than number of lines, that is, number of pixels arranged in the vertical direction in the block B (11 pixels in the example shown in FIG. 7).

(2-3) Pixel Classifying Process

After the second CPU 36 starts dividing the read image into blocks B, in S36 the second CPU 36 initializes the block number K, a chromatic color block number, an achromatic color block number to "0 (zero)", and in S37 increments the block number K by "1". In S38, the second CPU 36 executes the pixel classifying process for the K-th block B. That is, after the second CPU 36 starts dividing the read image into blocks, the second CPU 36 executes the pixel classifying process. The pixel classifying process classifies the pixels in the entire read image G into one of a background color pixel group and a non-background color pixel group. Here, the background color pixel group indicates pixels constituting the background region G1, and the non-background color pixel group indicates pixels constituting the non-background region G2. In the following descriptions, a pixel in the background color pixel group is referred to as a back ground color pixel and a pixel in the non-background color pixel group is referred to as a non-background color pixel.

More specifically, as shown in the middle part of FIG. 7, the second CPU 36 classifies a pixel into the background color pixel group by referring to the histogram of R values generated in S51 when an R value (a density value) of the pixel is within a background color range D. On the other hand, the second CPU 36 classifies a pixel into the non-background color pixel group by referring to the histogram of the R values when an R value (a density value) of the pixel is not within the background color range D. The background color range D is a density range that includes the mode value Rm. In the example, the mode value Rm is at the center of the background color range D. However, the mode value Rm may not be at the center of the background color range D. This configuration can prevent erroneous classification in which a pixel, which should be determined as the background color pixel, is erroneously determined to the non-background pixel in a more effective manner, compared with a conceivable example in which pixels are determined to the background color pixel only when the density values of the pixels coincides with the mode value Rm. Here, the erroneous classification is caused by variations and unevenness of the background color of the read image G, for example.

(2-4) Block Color Determining Process

After the pixel classifying process, in S39 the second CPU 36 executes the block color determining process for the K-th block B. The block color determining process determines whether the K-th block is a chromatic color block or an achromatic color block, using the color information of the non-background color pixels, but without using the color information of the background color pixels.

More specifically, in S61 the second CPU 36 executes the color conversion process that converts the density values R, G, and B of the non-background color pixels into data represented in a color space having the color difference components. In the embodiment, the second CPU 36 converts the density values R, G, and B into data represented in the YCbCr color space having a luminance component Y and two color difference components Cb and Cr. Then, in S62 the second CPU 36 generates a color difference histogram of the non-background color pixels for each of the color differences Cb and Cr.

A lowest part of FIG. 7 shows the color difference histogram, as an example. The vertical axis indicates the number of pixels (pixel count) and the horizontal axis indicates the color difference Cb or Cr. Each of the color differences Cb and Cr is expressed by a numerical value within the range between 0 and 255, similarly to S32. In the histogram, the solid line part H1 shows the histogram of non-background color pixels, whereas the double-dotted chain line part H2 shows the histogram of background color pixels. The number of non-background color pixels is smaller than the number of background color pixels.

In a conceivable example, where a block is determined to be one of a chromatic color or an achromatic color based on both the non-background color pixels and the background color pixels. In this case, because number of the non-background color pixels is smaller than the number of the background color pixels, the color differences of the non-background color pixels is ignored when the determination of the block is made by the color differences of the background color pixels. Specifically, as shown in the lowest part of FIG. 7, the background color of the block B is achromatic color whereas the non-background color of the block B is chromatic color. In this case, because the tiny non-background color part is ignored, the configuration of the conceivable example determines the block B as the achromatic color block, although the block B should be determined as the chromatic color block.

On the other hand, in the embodiment, the second CPU 36 determines whether the K-th block is a chromatic color block or an achromatic color block, using the solid line part H1 in the histogram that corresponds to the non-background color pixels, without using the double dot chain part H2 corresponding to the background color pixels. More specifically, the second CPU 36 determines whether each of the non-background color pixels is a chromatic color pixel or an achromatic color pixel. Specifically, as a first determination, using the solid line part H1 of the histogram of the color difference Cb, a pixel is determined to a chromatic color pixel when the color difference Cb of the pixel is within the chromatic color range whereas determined to a achromatic color pixel when the color difference Cb of the pixel is out of the chromatic color range. Similarly, as a second determination, using the solid line part H1 of the histogram of the color difference Cr, a pixel is determined to the non-background color pixel when the color difference Cr of the pixel is within the chromatic color range whereas determined to a achromatic color pixel when the color difference Cr of the pixel is out of the chromatic color range. That is, for one pixel, the result of the first determination may be different from those of the second determination. For example, one pixel may be determined as the chromatic color pixel in the first determination whereas determined as the chromatic color pixel in the second determination. Based on the first and second determinations, in S63 the second CPU 36 calculates a chromatic color pixel ratio for each of the color differences Cb and Cr. The chromatic color pixel ratio is a ratio of the number C1 to the total number CA (=(C1/CA×100). Here, the total number CA is the total number of the non-background color pixels in the single block B. When calculating the chromatic color pixel ratio for the color difference Cb, the number C1 is the number of the chromatic color pixels determined in the first determination from among the non-background color pixels in the single block B. When calculating the chromatic color pixel ratio for the color difference Cr, the number C1 is the number of the chromatic color pixels determined in the second determination from among the non-background color pixels in the single block B.

In S64, the second CPU 36 determines whether the K-th block B satisfies the chromatic color block condition or not. The chromatic color block condition is, for instance, that at least one of the chromatic color pixel ratios with respect to the color differences Cb and Cr exceeds the color block threshold value (e.g., 0.3%). Or, the chromatic color condition may be that an average value of the chromatic color pixel ratios with respect to the color differences Cb and Cr exceeds the color block threshold value (e.g., 0.3%). When the second CPU 36 determines that the K-th block satisfies the chromatic color block condition (S64: YES), in S65 the second CPU 36 determines that the K-th block B is chromatic color and increments the number of chromatic color blocks by 1. On the other hand, when second CPU 36 determines that the K-th block does not satisfy the chromatic color block condition (S64: NO), in S66 the second CPU 36 determines that the K-th block B is achromatic color and increments the number of achromatic color blocks by 1. Then, the second CPU 64 ends the block color determining process and proceeds to S40 in FIG. 4.

In S40, the second CPU 36 determines whether the block color determining process is executed for each of the blocks B in the read image G or not. More specifically, the second CPU 36 determines whether the current block number K is equal to the final block number (which is equal to the total number of blocks KA in the read image G) or not. When the second CPU 36 determines that the current block number K is not equal to the final block number KA (S40: NO), the second CPU 36 returns to S37, and executes the pixel classifying process and the block color determining process on the next block B.

(2-5) Non-Background Color Determining Process and Image Color Determining Process When the second CPU 36 determines that the current block number K is equal to the final block number KA, the second CPU 36 executes the non-background determining process (S41, S42). The non-background color determining process is for determining whether the non-background color region G2 is a chromatic color region or an achromatic color region based on the result of the block color determining process.

More specifically, in S41 the second CPU 36 calculates the chromatic color block ratio from the result of the block color determining process. The chromatic color block ratio is the ratio of the number of chromatic color blocks obtained in S65 to the total number of blocks KA in the read image G. In S42, the second CPU 36 determines whether the read image G satisfies the second chromatic color condition or not. The second chromatic color condition is for example that the chromatic color block ratio exceeds the chromatic color image threshold value (e.g., 0.3%). As shown in FIG. 7, the non-background color region G2 is smaller than the background color region G1. However, in the embodiment, the chromatic color image threshold value is set to 0.3%, and thus the second chromatic color condition is satisfied when the block(s) B corresponding to the non-background region G2 satisfies the chromatic color block condition. In other words, it is determined that the non-background color region (G2, for example) is chromatic color by the second chromatic color condition. That is, the second color condition is a condition for determining whether the non-background color region is chromatic color or achromatic color. If the second color condition is satisfied, the non-background color region is chromatic color whereas if the second color condition is not satisfied, the non-background color region is achromatic color.

When the second CPU 36 determines that the read image G satisfies the second chromatic color condition (S42: YES), in S34 the second CPU 36 stores a chromatic color flag in the second RAM 38. When, on the other hand, the second CPU 36 determines that the read image G does not satisfy the second chromatic color condition (S42: NO), in S43 the second CPU 36 stores an achromatic color flag in the RAM 38. Then, the second CPU 36 ends the image process and proceeds to S16 shown in FIG. 3. In the example shown in FIG. 7, the background color region G1 is achromatic color and the non-background color region G2 is chromatic color in the read image G. In this case, the second CPU 36 determines that the read image G satisfies the second chromatic color condition (S42: YES) even though the non-background color region G2 is smaller than the background color region G1 and determines that the read image G1 is a chromatic color image.

(3) Read Data Conversion Process

In S16 (FIG. 3), the second CPU 36 determines whether the read image G is a chromatic color image or not, based on the result of the non-background color determining process. More specifically, the second CPU 36 determines whether a chromatic color flag is stored in the second RAM 38 or not. When the second CPU 36 determines that a chromatic color flag is not stored in the second RAM 38 (S16: NO), in S17 the second CPU 36 executes a process for converting the read data into gray scale data.

That is, in S17 the second CPU 36 leaves one color data of RGB color data (R, G, or B color data) and discards the remaining data of the RGB color data corresponding to remaining two colors. Alternatively, second CPU 36 may converts the read RGB color data into data represented in a color space data including luminance component, and leaves the luminance component of the converted data and discards remaining data of the converted data. Generally, a high quality JPEG (Joint Photographic Experts Group) data can be obtained, by converting the read data of the achromatic color image into gray scale data before converting the read data into JPEG data.

In S18, the second CPU 36 performs a JPEG conversion process for converting the gray scale data into JPEG data, in S20 stores the JPEG data in a specified memory, and ends the computer side process. Then, the second CPU 36 executes the process S11 again after a predetermined time period. The specified memory for storing the JPEG data may be the second RAM 38 or the external memory 4.

When the second CPU 36 determines that a chromatic color flag is stored (S16: YES), in S19 the second CPU 36 does not converts the read data into gray scale data but executes the JPEG conversion process to produce JPEG data having RGB values, in S20 stores the JPEG data in the specified memory, and ends the computer side process.

Advantages of this Embodiment

According to the embodiment, the second image processing unit 31 determines whether the non-background color region G2 is chromatic color or achromatic color, using the color information of the non-background color pixels, without using the color information of the background color pixels. The second image processing unit 31 determines whether the read image is chromatic color or achromatic color based on the result of the determination. Accordingly, the computer 3 can determine whether the read image G is a chromatic color image or an achromatic color image based on the result of the color determination the non-background color region G2 while suppressing the influence of the background color pixels.

There is a possibility of erroneous determination, in which the read image is determined as the achromatic color image though the read image should be determined as the chromatic image. However, the configuration described above can be prevent the erroneous determination more efficiently than a conceivable example that determines whether the read image is chromatic color or achromatic color without discriminating the background color pixels and the non-background color pixels. Additionally, the configuration according to the embodiment can prevent precision of the block color determining process and the process for determining color of the image (a chromatic color image or an achromatic color) from varying according to variation of the size of the non-background region G2, or, variation of the number of the non-background color pixels.

Furthermore, the second image processing unit 31 executes the process S35 and the subsequent processes if the background color of the read image G is determined as achromatic color in the background color determining process (S33: NO). On the other hand, when the second image processing unit 31 determines that the background color of the read image G is chromatic color in the background color determining process (S33: YES), in S34 the second image processing unit 31 determines that the read image G is a chromatic color image. With this configuration, when the background color of the read image G is determined as chromatic color in the background color determining process (S33: YES), the second image processing unit 31 can determine whether the read image G is a chromatic color image or an achromatic color image without executing the non-background color determining process.

Second Embodiment

Figure 9:
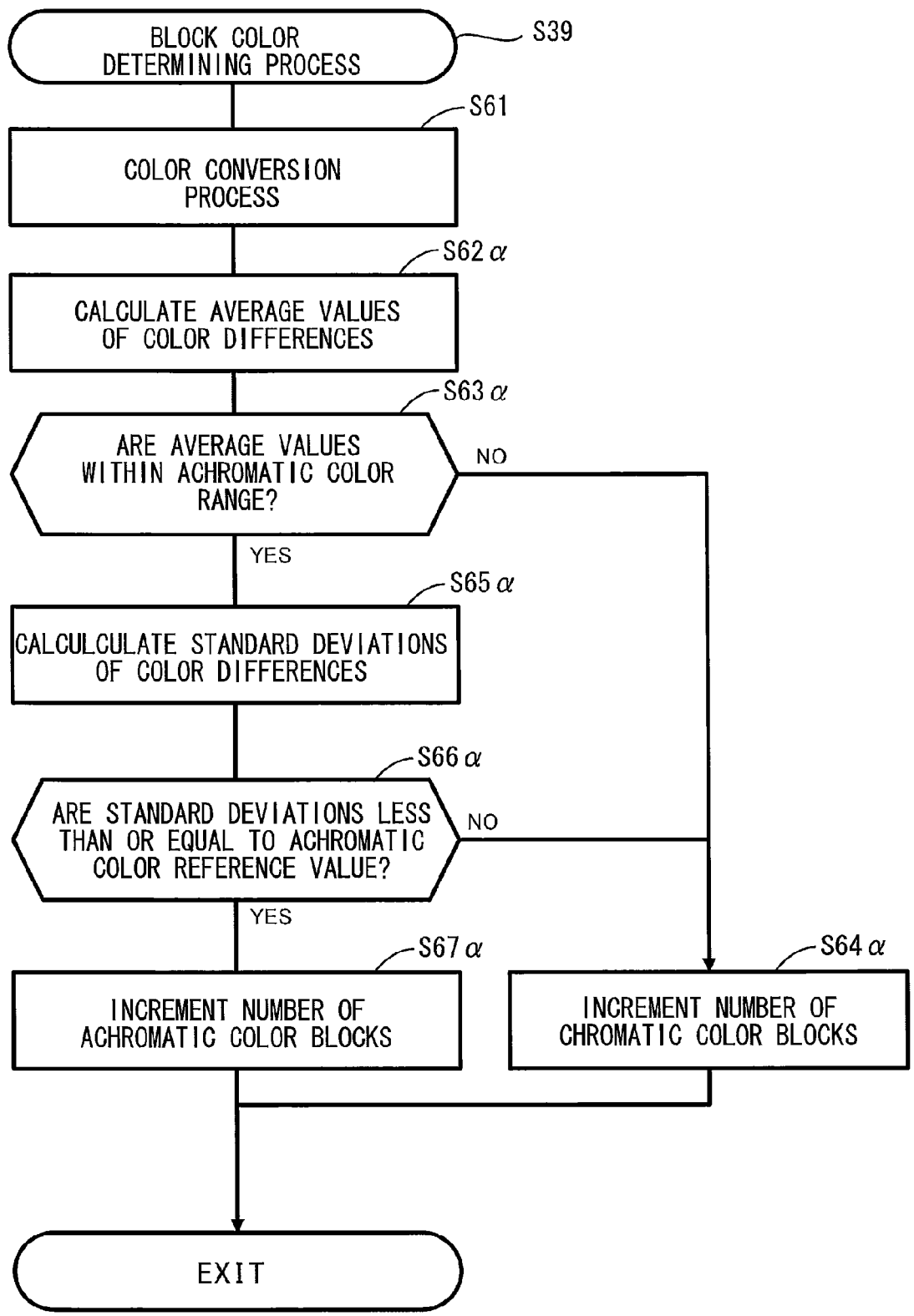
FIG. 9 is a flowchart illustrating a block color determining process according to the second embodiment.

FIG. 9 illustrates the second embodiment according to the present invention. The second embodiment is basically the same as the first embodiment except a block color determining process shown in FIG. 9. In the following description, like parts and components are designated with the same reference numerals to avoid duplicating description.

As shown in FIG. 9, after executing the color conversion process S61, the second CPU 36 calculates average values and variation values (standard deviation, in this example) with respect to the color differences Cb and Cr of the non-background color pixels, without generating the histogram. Then, the second CPU 36 determines if the K-th block satisfies an achromatic color block condition or not based on the average values and the variation values (S63α, S66α). The achromatic color block condition includes a condition 1 and a condition 2 as follows.

That is, the condition 1 is that for the non-background color pixels, both the average value of the color differences Cb and the average value of the color differences Cr are found within the achromatic color range.

The condition 2 is that for the non-background color pixels, both the standard deviation of the color differences Cb and the standard deviation of the color differences Cr are less than or equal to the achromatic color reference value The achromatic color reference value is less than or equal to, for example, the width of the achromatic color range shown in lower part of FIG. 7.

More specifically, in S62α the second CPU 36 calculates an average value of the color differences Cb and an average value of the color differences Cr for the non-background color pixels in the K-th block, and in S63α determines whether the average values of the color differences Cb and Cr are within the achromatic color range or not. When the second CPU 36 determines that at least one of the average values of the color differences Cb and Cr is not within the achromatic color range (S63α: NO), in S64α the second CPU 36 determines that the K-th block is chromatic color and adds 1 to the number of chromatic color blocks and ends the block color determining process. Then, the second CPU 36 proceeds to S40 in FIG. 4. In this case, the second CPU 36 can determine that the K-th block is a chromatic color block without calculating the standard deviation of the color differences Cb and Cr.

When the second CPU 36 determines that both the average values of the color differences Cb and Cr are within the achromatic color range (S63α: YES), in S65α the second CPU 36 calculates both the standard deviations of the color differences Cb and Cr, and in S66α determines whether both the standard deviations of the color differences Cb and Cr are less than or equal to the achromatic color reference value or not.

When both the standard deviations of the color differences Cb and Cr are less than or equal to the achromatic color reference value, the color differences of most of the non-background color pixels are within the achromatic color range and hence the K-th block is highly probably an achromatic color block. On the other hand, when at least one of the standard deviation of the color differences Cb and Cr exceeds the achromatic color reference value, the color differences of the non-background color pixels varies beyond the achromatic color range so that the K-th block is highly probably a chromatic color block.

Therefore, in S64α the second CPU 36 determines that the K-th block is chromatic color and adds 1 to the number of chromatic color blocks when the second CPU 36 determines that at least one of the standard deviations of the color differences Cb of Cr exceeds the achromatic color reference value (S66α: NO). On the other hand, in S67α the second CPU 36 determines that the K-th block is achromatic color and adds 1 to the number of achromatic color blocks when the second CPU 36 determines that both the standard deviation of the color differences Cb and Cr are less than or equal to the achromatic color reference value (S66α: YES). Then, the second CPU ends the block color determining process and proceeds to S40 in FIG. 4.

According to the second embodiment, a process for determining whether a block is a chromatic color block or an achromatic color block can be executed without generating histograms for the color differences Cb and the color differences Cr. Moreover, the personal computer 3 can accurately determines whether a block is a chromatic color block or an achromatic color block by using not only the average values of the color differences Cb and Cr but also the standard deviations of the color differences Cb and Cr.

MODIFICATIONS

While the invention has been described in detail with reference to the embodiments thereof, it would be apparent to those skilled in the art that various changes and modifications may be made therein without departing from the scope of the invention.

The Image processing device is not limited to a personal computer 3 and may be some other information processing device that acquires and processes an image obtained from an external device or an internal memory. For example, the information processing device may be a client computer, a server computer, and a portable terminal, such as, a smartphone or a tablet type terminal. The external device may be an external information processing device and an imaging device in addition to a scanner 2 and an external memory 4. The image processing device is not limited to a scanner 2 but may be a copier machine, or a multifunction peripheral having a plurality of functional features such as a reading function.

Part of the configuration of the invention implemented in hardware in the embodiment described above may be replaced by software and, conversely, part of the configuration of the invention implemented in software may be replaced by hardware. For example, the second image processing unit 31 may include a plurality of CPUs, and the plurality of CPUs may execute the computer side process. Or, the image processing unit 31 includes an ASIC (Application Specific Integrated Circuit) and the ASIC may execute the computer side process. Or, the image processing unit 31 includes both the plurality of CPUs and the ASIC, and the plurality of CPUs in conjunction with the ASIC executes the computer side process.

An interface in the computer 3 may acquire the image data from an internal memory of the scanner 2 such as the first RAM 28, and an internal memory of the computer 3 such as the second RAM 38.

The second image processing unit 31 may acquire image data stored in the external memory 4 via the connection port 35, and executes the image processes from S15 shown in FIG. 3 by using the acquired image data. In this case, the image data corresponds to the read data in the embodiments and the image based on the image data corresponds to the read image G.

In the background color identifying process S31, the image processing units 21 or 31 may calculate a density average value of the pixels for each of the primary colors, and then determine the color identified from the average values as the background color of the read image G. Alternatively, in the background color identifying process S31, the image processing units 21 or 31 may identify the color of the peripheral region of the read image G by using pixel values of pixels in the peripheral region, and set the identified color of the peripheral region to the background color. Here, the peripheral region includes a predetermined width from the edges within the read image G. The peripheral region is a blank space, a margin space, or a single color space in which no object is depicted, for example. Still alternatively, in the background color identifying process S31, the image processing units 21 or 31 may inquire at the user for the background color and identify the background color of the read image G from the background color information that the user inputs at the operation units 23, 33. With any of the above described alternative processes, the image processing units 21, 31 do not need to generate histograms.

The color conversion process (S32 and S61) is not limited to a YCbCr conversion process and may alternatively be a Lab conversion process for converting the RGB color values or the mode values Rm, Gm and Bm into data represented in Lab color space data.

Figure 8:
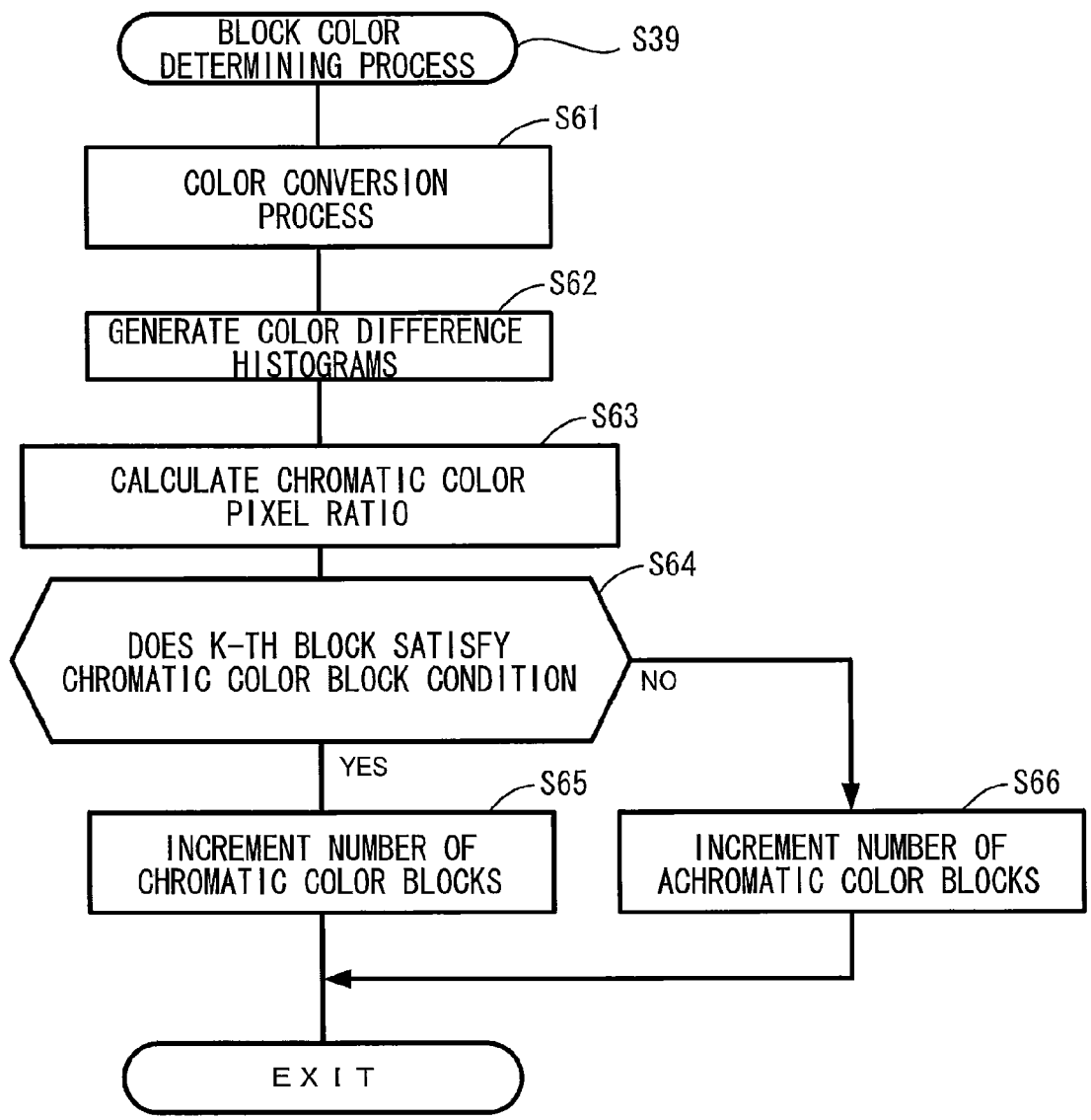
FIG. 8 is a flowchart illustrating a block color determining process according to the first.

The image processing units 21 or 31 may execute the pixel classifying process (S38) for the pixels that constitute the entire read image G without executing the image dividing process (S35). Still alternatively, the image processing unit 21 or 31 may not execute the pixel classifying process (S38), but extract the non-background color pixels from the pixels that constitute the entire read image G, and determines whether the non-background color region G2 is chromatic color or achromatic color by using the color information of the extracted non-background color pixels. For example, similarly to the process S39 (S62) shown in FIG. 8, histograms for the non-background pixels are made for color differences Cb and Cr. Similarly to S63, the image processing unit 21 or 31 determines whether each of the non-background color pixels in the image G to be a chromatic color pixel or an achromatic color pixel, and similarly to S63, S64 calculates a chromatic color pixel ratio for the pixels in the image G and determines whether the chromatic color pixel ratio exceeds to a prescribed threshold value. If a positive determination is made, the image processing unit 21 or 31 determines that the non-background color region G2 is chromatic color and therefore stores the chromatic color flag in the second RAM 38 similarly to S34 whereas a negative determination is made, the image processing unit 21 or 31 determines that the non-background color region G2 is achromatic color and stores the achromatic flag in the second RAM 38 similarly to S43. However, compared with this modified configuration not dividing the read image G into blocks, in the embodiment described above the computer 3 can efficiently determine whether the color region G2 is chromatic color or achromatic color on a block basis.

In the pixel classifying process S38, the image processing unit 21 or 31 may classify the pixels in the entire read image G into one of the background color pixel group and the non-background color pixel group by using the histogram with respect to the primary color of G or B. Still alternatively, the image processing unit 21 or 31 may convert the read data of the entire read image G into data represented in a color space having color difference components, and generates histogram(s) with respect to the color differences. Thereafter, based on the histogram(s), the image processing unit 21 or 31 determines each pixel, whose color difference is within the reference range, as background color pixel. Here, the reference range includes the average value Cba or the average value Cra calculated in S33.

In the block color determining process S64, the image processing unit 21 or 31 may determine whether a block B is a chromatic color block or an achromatic color block based on at least one of the number of chromatic color pixels from among the non-background color pixels and the number of achromatic color pixels from among the non-background color pixels. For example, in S63 the image processing unit 21, 31 calculates the ratio of the achromatic color pixels for each of the color differences Cb, Cr. The achromatic color pixel ratio (=(C2/CA×100) is the ratio of the number of the achromatic color pixels from among the non-background color pixels in the block B (C2) to the total number of non-background color pixels in the block B (CA). Thus, in S64, the image processing unit 21 or 31 determines whether the K-th block satisfies the achromatic color block condition or not. The achromatic color block condition is, for instance, that both the achromatic color pixel ratio of Cb and the achromatic color pixel ratio of Cr is greater than or equal to the achromatic color block threshold value (e.g., 99.7%). Or, the achromatic color block condition is that an average value of the achromatic color pixel ratios of color differences Cb and Cr is greater than or equal to the achromatic color block threshold value (e.g., 99.7%).

As described above, the chromatic color block condition and the achromatic color block condition concern respectively the chromatic color pixel ratio and the achromatic color pixel ratio. However, the present invention is not limited to these conditions. If the total number of pixels CA of each block B is a fixed value, the chromatic color block condition and the achromatic color block condition may respectively relate to the number of chromatic color pixels from among the non-background color pixels C1 and the number of achromatic color pixels from among the non-background color pixels C2. For example, the chromatic color block condition may be that the number of chromatic color pixels of the non-background color pixels C1 is greater than or equal to a prescribed threshold value. In this case, the image processing unit 21 or 31 does not need to calculate the chromatic color pixel ratio and the achromatic color pixel ratio.

In the non-background color determining process S41, S42, the image processing unit 21 or 31 may determine whether the non-background color is a chromatic color or achromatic color based on at least one of the number of chromatic color blocks and the number of achromatic color blocks. For example, in S41 the image processing unit 21 or 31 calculates the achromatic color block ratio based on the result of the block color determining process S39. The achromatic color block ratio is the ratio of the number of achromatic color blocks (see S65) to the total number of blocks KA. The image processing unit 21 or 31 determines whether the read image G satisfies the achromatic color image condition or not in S42. The achromatic color image condition is, for example, that the achromatic color block ratio is greater than or equal to the achromatic color image threshold value (e.g., 99.7%).

As described above, the chromatic color image condition and the achromatic color image condition concern respectively the chromatic color block ratio and the achromatic color block ratio. However, the present invention is not limited to such conditions. If the total number of blocks KA is a fixed value, the chromatic color image condition and the achromatic color image condition may respectively relate to the number of chromatic color blocks and the number of achromatic color blocks. For example, the chromatic color image condition may be that the number of chromatic color blocks is greater than or equal to a prescribed threshold value. In this case, the image processing unit 21 or 31 does not need to calculate the chromatic color block ratio and the achromatic color block ratio.

After executing the background color identifying process S31, the image processing unit 21 or 31 may always proceed to S36 without executing the background color determining process (S32, S33). Alternatively, the image processing unit 21 or 31 may always execute the non-background color determining process (S41, S42) regardless of the result of the background color determining process (S32, S33). When the image processing units 21 or 31 determines that the non-background color is chromatic color in at least one of the background color determining process (S32, S33) and the non-background color determining process (S41, S42), the image processing units 21 or 31 may determine that the read image G is a chromatic color image. According to this configuration, the read image G can be determined to be either a chromatic color image or an achromatic color image not only by the non-background color determining process but also by the background color determining process.

In the second embodiment 2, the variation value is not limited to the standard deviations, but may be a variance or a difference between the maximum value and the minimum value with respect to at least one of the color differences Cb and Cr. In this case, the second CPU 36 determines whether the variation value(s) exceeds an achromatic color reference value or not. According to this modification, the block color determining process can determine whether a block is a chromatic color block or an achromatic color block, in more accurate manner than a configuration using the average value. Still alternatively, the second CPU 36 may calculate an average value with respect to at least one of the color differences Cb and Cr and then determine whether the average value(s) is within a achromatic color range or not. According to this configuration, whether a block is a chromatic color block or an achromatic color block can be determined by a relatively simple process if compared with a configuration in which the variation value is calculated.

After the start of the reading process in S4, the first image processing unit 21 of the scanner 2 may execute the image process of S15 shown in FIG. 3. Subsequently, the first image processing unit 21 transmits, to the computer 3, the read data and the result of the image color determining process, or stores the read data and the result of the image color determining process in a memory such as the first RAM 28. In this case, the first CPU 26 may control the image processing circuit 29 to execute the process to generate the histogram (S51) and the color conversion process (S32, S61). The first image processing unit 21 may execute the processes from S16 to S20 in FIG. 3. In this case, the first image processing unit 21 may include a single computer or a plurality of CPUs or hardware circuit such as ASIC, and only one CPU, or only prescribed number of CPUs may execute the image process, or only the hardware circuit may execute the image process.

What is claimed is:

1. An image processing device comprising:
an acquiring unit configured to acquire image data that has pixel values and represents an image having pixels corresponding to the pixel values; and
a control device configured to:
identify a background color of the image;
determine whether the identified background color is a chromatic color or an achromatic color;
classify each of the pixels into either one of a background color pixel group or a non-background color pixel group, classification into the background color pixel group being made when a pixel value indicates the background color, classification into the non-background color pixel group being made when a pixel value does not indicate the background color;
determine, after it is determined that the identified background color is the achromatic color, whether a partial region of the image having the non-background pixel is a chromatic color region or an achromatic color region by using pixel values corresponding to pixels in the partial region that are classified into the non-background color pixel group and without using pixel values corresponding to pixels classified into the background color pixel group;
determine that the image is a chromatic color image when it is determined that the partial region is the chromatic color region; and
determine that the image is an achromatic color image when it is determined that the partial region is the achromatic color region,
wherein the control device determines that the image is the chromatic color image, at least one of when it is determined that the background color is the chromatic color and when it is determined that that the partial region is the chromatic color region.

2. The image processing device according to claim 1, wherein the control device is configured to specify a density value based on each of the pixel values, and
wherein the control device is configured to classify the each of the pixels into the background color pixel group when a density value corresponding to the each of the pixels is within a prescribed range whereas the control device is configured to classify the each of the pixels into the non-background color pixel group when the density value corresponding to the each of the pixels is out of the prescribed range, the prescribed range being defined such that a density value corresponding to the background color is included in the prescribed range.

3. The image processing device according to claim 1, wherein the control device is further configured to:
divide the image into a plurality of blocks having a same size; and
determine whether each of the plurality of blocks is a chromatic color block or an achromatic color block based on pixel values corresponding to pixels in the each of the plurality of blocks that are classified into the non-background color pixel group without using pixel values corresponding to pixels in the each block that are classified into the background color pixel group,
wherein the control device determines whether the partial region is the chromatic color region or the achromatic color region based on at least one of number of blocks that are determined as the chromatic color block and number of blocks that are determined as the achromatic color block.

4. The image processing device according to claim 1, wherein the control device is further configured to:
calculate color differences based on pixel values for pixels classified into the non-background color;
calculate an average value of the color differences; and
determine whether the partial region of the image having the non-background pixel is chromatic color region or achromatic color region based on the average value.

5. The image processing device according to claim 1, wherein the control device is further configured to:
calculate color differences based on pixel values for pixels classified into the non-background color pixel group;
calculate a standard deviation of the calculated color differences; and
determine whether the partial region of the image having the non-background pixel is the chromatic color region or the achromatic color region based on the standard deviation.

6. An image processing device comprising:
an acquiring unit configured to acquire image data that has pixel values and represents an image having pixels corresponding to the pixel values; and
a control device configured to:
identify a background color of the image;
determine whether the identified background color is a chromatic color or an achromatic color;
classify each of the pixels into either one of a background color pixel group and a non-background color pixel group, classification into the background color pixel group being made when a pixel value indicates the background color, classification into the non-background color pixel group being made when a pixel value does not indicate the background color;
determine whether a partial region of the image having the non-background pixel is a chromatic color region or an achromatic color region by using pixel values corresponding to pixels in the partial region that are classified into the non-background color pixel group and without using pixel values corresponding to pixels classified into the background color pixel group;
determine that the image is a chromatic color image when it is determined that the partial region is the chromatic color region; and
determine that the image is an achromatic color image when it is determined that the partial region is the achromatic color region,
wherein the control device determines that the image is the chromatic color image, at least one of when it is determined that the partial region is the chromatic color region and when it is determined that the background color is chromatic color,
wherein in the background color identifying process, the control device is configured to:
generate a histogram of density values that are determined based on the pixel values; and
set the background color based on a mode value of the histogram.

7. A non-transitory computer readable storage medium storing a set of program instructions installed on and executed by a computer acquiring image data that has pixel values and represents an image having pixels corresponding to the pixel values, the program instructions comprising:
identifying a background color of the image;
determining whether the identified background color is a chromatic color or an achromatic color;
classifying each of the pixels into either one of a background color pixel group and a non-background color pixel group, classification into the background color pixel group being made when a pixel value indicates the background color, classification into the non-background color pixel group being made when a pixel value does not indicate the background color;
determining, after it is determined that the identified background color is the achromatic color, whether a partial region of the image having the non-background pixel is a chromatic color region or an achromatic color region, without using pixel values corresponding to pixels classified into the background color pixel group;
determining that the image is a chromatic color image when his determined that the partial region is the chromatic color region; and
determining that the image is an achromatic color image when it is determined that the partial region is the achromatic color region,
wherein it is determined that the image is the chromatic color image, at least one of when it is determined that the background color is the chromatic color and when it is determined that that the partial region is the chromatic color region.

* * * * *